United States Patent
Ball et al.

(10) Patent No.: US 6,559,242 B1
(45) Date of Patent: May 6, 2003

(54) SURFACE ACTIVATION AND COATING PROCESSES OF A THERMOPLASTIC OLEFIN USING AN AQUEOUS IMMERSION BATH AND PRODUCTS PRODUCED THEREBY

(75) Inventors: James Charles Ball, Milan, MI (US); Willie C Young, Southfield, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/063,543

(22) Filed: May 2, 2002

(51) Int. Cl.$^7$ ................................................. C08F 8/00
(52) U.S. Cl. ........................ 525/371; 427/302; 427/307; 525/333.8; 525/387
(58) Field of Search ................................ 525/371, 387; 427/302, 307

(56) References Cited

U.S. PATENT DOCUMENTS

| | | | | |
|---|---|---|---|---|
| 4,086,128 A | * | 4/1978 | Sugio et al. ................... | 216/83 |
| 4,299,863 A | * | 11/1981 | Tanimoto et al. ............ | 427/140 |
| 4,645,573 A | * | 2/1987 | Orban ......................... | 205/138 |
| 5,160,600 A | * | 11/1992 | Patel et al. .................. | 205/169 |
| 5,580,485 A | * | 12/1996 | Feringa et al. .............. | 510/311 |
| 5,725,678 A | * | 3/1998 | Cannon et al. ................. | 134/1 |

FOREIGN PATENT DOCUMENTS

| RU | 2076912 | * | 4/1997 |
|---|---|---|---|
| WO | WO 98/51437 | * | 11/1998 |

* cited by examiner

*Primary Examiner*—Bernard Lipman
(74) *Attorney, Agent, or Firm*—Damian Porcari

(57) ABSTRACT

An aqueous immersion bath contains a water-soluble peroxide compound and a transition metal salt and is used to activate the surface of a thermoplastic olefin prior to the application of a coating thereon. After immersion of the thermoplastic olefin material in the aqueous immersion bath, an improved adhesion between the coating and the surface of the thermoplastic olefin material is obtained.

20 Claims, No Drawings

SURFACE ACTIVATION AND COATING PROCESSES OF A THERMOPLASTIC OLEFIN USING AN AQUEOUS IMMERSION BATH AND PRODUCTS PRODUCED THEREBY

BACKGROUND OF INVENTION

1. Field of the Invention

The invention relates to a method of activating a surface of a thermoplastic olefin material utilizing an aqueous immersion bath employing a water-soluble peroxide compound and at least one transition metal capable of undergoing redox cycling and a thermoplastic olefin having a surface activated by the inventive method. The present invention also relates to a coating process in which a coating is applied to the activated thermoplastic olefin and a thermoplastic olefin having a coating applied thereto by the inventive method.

2. Background of the Invention

Thermoplastic olefin materials that otherwise have good properties for use in the automobile industry are difficult to apply a coating thereto because the surface of the thermoplastic olefin does not have any polar functional groups which are available to bond with a coating. In order to solve this problem, three different approaches have commonly been taken.

The first approach provides an intermediate adhesive between the thermoplastic olefin substrate and the subsequent coating. This approach has problems in that an adhesive and organic solvents are needed to coat the thermoplastic olefin material which results in the process being expensive, complicated and having an adverse impact on the environment.

The second approach involves the modification of the surface of the thermoplastic olefin by generating a plasma around the thermoplastic part. However, this procedure requires the use of complex equipment and extremely specialized training which results in the process being very expensive. Additionally, the treatment of the thermoplastic material may not be evenly applied due to the shape of the object to be treated.

A third approach uses a flame to oxidize the surface of the thermoplastic material. This procedure is inherently dangerous due to the hazards of an open flame being used and this process also may produce uneven treatment depending on the shape of the plastic object.

The use of a peroxide compound for removing contaminants from a surface and as a pretreatment of an epoxy substrate prior to the application of a metallic film thereon is well known. Sugio, U.S. Pat. No. 4,086,128, discloses a process for roughening the surface of an epoxy resin prior to the application of a metallic film thereon which comprises a step of etching the pretreated resin with an etching solution containing hydrogen peroxide and sulfuric acid to roughen the surface of the resin.

Tanimoto et al, U.S. Pat. No. 4,299,863, discloses the treatment of an epoxy resin substrate with a water-soluble peroxide compound before sensitizing the epoxy resin substrate for electroless copper plating.

Orban, U.S. Pat. No. 4,645,573, discloses a method for continuously and sequentially coating a polyester material with copper and silver which involves an etching step in hydrogen peroxide. Feringa et al, U.S. Pat. No. 5,580,485, discloses a catalytically active iron complex which can activate hydrogen peroxide or peroxy acids and is said to have both favorable stain removable and dye transfer inhibition properties. Cannon et al, U.S. Pat. No. 5,725,678, discloses an aqueous-based process for cleaning organic residues from industrial equipment which employs hydrogen peroxide and an iron salt as a catalyst or enhancer.

SUMMARY OF INVENTION

The present invention provides a method of activating a surface of a thermoplastic olefin material in which the thermoplastic olefin material is immersed in an aqueous bath containing a water-soluble peroxide compound and at least one transition metal salt. Another aspect of the present invention is directed to a thermoplastic olefin having its surface activated by an aqueous immersion bath containing the water-soluble peroxide compound and at least one transition metal salt. Still another aspect of the present invention is directed to a method of coating a thermoplastic olefin in which a coating is applied to the activated surface of the thermoplastic olefin and a still further aspect of the present invention is directed to a thermoplastic olefin having a coating provided on a surface thereof. The present invention is especially suitable for the application of a primer, a clear coat or a color coat onto the surface of the thermoplastic polyolefin.

DETAILED DESCRIPTION

In the present invention, an aqueous immersion bath is formed which primarily contains a water-soluble peroxide compound and at least one transition metal capable of undergoing redox cycling. Any water-soluble organic and inorganic peroxide compound is suitable for use in the present invention, such as hydrogen peroxide, sodium peroxyborate, sodium peroxycarbonate, ethyl hydroperoxide and peroxyacetic acid, with hydrogen peroxide being especially preferred for use in the present invention.

It is believed that the aqueous immersion bath of the present invention generates hydroxyl radicals which abstract hydrogen atoms from the surface of a thermoplastic olefin to form radical groups on the thermoplastic olefin surface which can react with oxygen or water and produce an oxidized surface which is more susceptible to bonding with a subsequent coating. The temperature of the aqueous immersion bath during the treatment of the plastic is preferably from about 20 to about 100° C. with the pH of the aqueous bath preferably being no greater than about 9.

The transition metal salt used in the present invention serves as a catalyst in the reaction of the water-soluble peroxide compound with the surface of the thermoplastic olefin material.

Since it is preferable that the transition metal in the salt cycle between oxidation states, a mixture of the lower and higher oxidation states of the transition metal can be present in solution. A mixture of transition metals that result in efficient redox cycling is preferred. Iron and copper are preferred transition metals used in the present invention. The anion of the transition metal salt can be chloride, sulfate, nitrate, carbonate, acetate, phosphate and any other anion which would allow the salt to provide the transition metal cation in the aqueous immersion bath and not materially interfere with the activation of the surface of the thermoplastic olefin. Ferrous sulfate or a mixture of ferrous sulfate and cupric sulfate are preferred in the present invention. Preferably, the water-soluble peroxide compound is present in the aqueous immersion bath in an amount of from 3 to 30 wt. % and the transition metal salt is present in an amount of from 0.05 to 0.5 grams per 100 milliliters of the aqueous immersion bath. Additional additives such as buffering agents for adjusting the pH of the aqueous immersion bath can be present so long as they do not interfere with the peroxide compound's reaction with the surface of the thermoplastic olefin.

Thermoplastic olefins used in the present invention include polyethylene, polypropylene, polybutylene and copolymers, blends and alloys thereof. Especially preferred are polypropylene, polyethylene and copolymers, blends and alloys thereof.

The time necessary for the thermoplastic olefin material to be immersed in the aqueous immersion bath of the present invention is dependent on factors such as the temperature of the aqueous immersion bath, the amount of water-soluble peroxide compound and transition metal salt(s) contained in the bath and the properties of the thermoplastic olefin material and a suitable time frame for obtaining the desired surface activation is readily obtainable to one of ordinary skill in the art. After the thermoplastic olefin has been immersed in the aqueous bath and its surface activated, it is removed, rinsed and dried. After drying, the coating can be applied to the surface of the plastic material by any conventional manner.

Many different types of coatings can be applied to the activated surface of the plastic material with primers, color coat and clear coat materials and adhesives being especially suitable for use in the present invention. Examples of clear coat materials usable in the present invention include acrylic, epoxy, polyester and polyurethane coatings. Examples of primers include polyesters, which can be crosslinked with a melamine formaldehyde resin. The color coating can be pigmented acrylics or polyesters crosslinked with isocyanates, melamine formaldehyde resins, epoxy acids, etc.

The following examples are offered to illustrate particular embodiments of the present invention but are not intended to be limitative thereof unless otherwise noted.

EXAMPLE 1

10 plastic strips (1×3 inch) composed of a thermoplastic olefin (TPO) plastic (polyethylene-polypropylene copolymer) were each immersed in 100 mL of 30% hydrogen peroxide to which 0.5 g of $FeSO_4$ had been added. The ensuing reaction was very vigorous with the evolution of oxygen and heat. The plastic strips were held in the solution until the reaction had mostly subsided, about 20 minutes. The strips were then carefully rinsed in deionized, distilled water and allowed to air dry overnight.

The strips were then coated with a clear acrylic polymer and heated at 120° C. for 20 minutes. The strips were then scored with a crosshatching pattern and a standard tape-pull test, the crosshatch tape pull test, was carried out on the coated plastic strips. Untreated control strips all failed to show any adhesion of the clear coat to the plastic strip. None of the 10 treated plastic strips showed loss of clear coat from the plastic surface indicating that these strips could be painted directly.

Comparative Example 1

Three sets of three TPO strips identical to those of Example 1 were treated with 1) mL hot 30% hydrogen peroxide (T=94° C.), 2) hot deionized, distilled water (T=91° C.), and 3) hot deionized, distilled water containing 0.5 g ferrous sulfate. All nine strips failed the crosshatch tape pull test miserably. These results confirm the requirement of hydrogen peroxide and ferrous sulfate in order to activate the surface of the plastic.

Comparative Example 2

The conditions of Example 1 were repeated with vanadyl sulfate being substituted for ferrous sulfate. Three TPO strips identical to those of Example 1 were treated with 100 mL 30% hydrogen peroxide and 0.5 g vanadyl sulfate for 20 minutes. The coupons were rinsed, dried, coated, and tested as described above. All three strips failed the crosshatch tape pull test.

EXAMPLE 2

Chemical analysis of the surface of TPO coupons were analyzed by XPS to see if an increase in oxygen was present on the surface of the strips after treatment with 30% hydrogen peroxide and ferrous sulfate. Larger pieces of TPO (3×4.5 inch) were used because they were easier to coat and the crosshatching could be done in the middle of the pieces, thereby avoiding any edge artifacts that may arise during the coating process. The following treatments were carried out and the associated atomic percent of the elements found on the plastic surface is shown below.

TABLE 1

Atomic Percent of Elements Found on TPO Squares Treated with 100 mL 30% Hydrogen Peroxide and 0.5 g Ferrous Sulfate for 20 Minutes [t1]

| Pretreatment | Elemental Composition-Atomic Percent | | | | |
|---|---|---|---|---|---|
| | C | O | Si | S | Fe |
| A) Control treated with | | | | | |
| 100 mL boiling 30% | 98.8 | 1.1 | 0.1 | — | — |
| Hydrogen Peroxide | 98.3 | 1.4 | 0.3 | — | — |
| B) Test Strip-Side 1 | 87.7 | 10.3 | — | 0.3 | 1.7 |
| | 87.1 | 10.7 | — | 0.4 | 1.7 |
| C) Test Strip-Side 2 | 92.9 | 6.2 | — | 0.1 | 0.7 |
| | 92.2 | 6.9 | — | 0.1 | 0.8 |

This table shows the presence of additional oxygen on the surface of the treated plastic along with some iron sulfate. The control strip (treated with boiling 30% hydrogen peroxide) showed an increase in oxygen on the surface from 0.6% (untreated control, data not shown) to about 1 percent while the treated strips had 6.5–10.5% oxygen on the surface. Two strips were treated with boiling 30% hydrogen peroxide and subjected to the crosshatch tape pull test both strips failed. These data suggest that simply boiling hydrogen peroxide does not add sufficient oxygen to the surface of the plastic strips to allow adequate binding of a coating. In addition, the presence of a small amount of iron sulfate on the surface of the strips does not interfere with the binding of a coating.

EXAMPLE 3

Three sets of three squares of TPO plastic were used in this experiment. All nine squares were treated with 100 30% hydrogen peroxide and 0.5 g ferrous sulfate individually to generate true replicates and coated with a clear acrylic polymer. Each square was then scored in the usual crosshatch pattern. Three squares were immediately tested by the crosshatch tape pull test and all three passed. Three squares were then placed in a Thin Layer Chromatography tank to which about 5 mm of water had been added. The tank was preheated in an oven to 70° C. and the squares were exposed to this high humidity environment for 11 days. The tank was checked daily for water and was never allowed to run dry. The remaining three strips were left exposed to room air for 11 days. At the end of 11 days, the three strips in the TLC tank were removed one at a time and tested in the crosshatch tape pull test all three squares passed. The three remaining squares were then tested and they passed. This experiment shows that the coating on these plastic strips did not fail even when exposed to high humidity at 70° C. or ambient room air for 11 days.

EXAMPLE 4

The effects of different concentrations of ferrous sulfate and hydrogen peroxide were evaluated by the crosshatch tape pull test for TPO plastic. Three TPO coupons (1×3 inch) were used at each concentration of hydrogen peroxide and ferrous sulfate. The results from this experiment are shown below in Table 2.

TABLE 2

[t2]

| Amount of Ferrous sulfate added to 100 mL of Hydrogen Peroxide | Pass or Failure of the Crosshatch Tape Pull Test. An estimate of the percent of the area removed during the test is shown. Less than 5% removal is considered a positive test. Percent of Hydrogen Peroxide | | |
|---|---|---|---|
| | 10% | 20% | 30% |
| 0.1 g | Passed | Pass | Pass |
| | Passed (2%) | Pass | Pass |
| | Passed | Pass | Pass |
| 0.3 g | Passed | Pass | Pass |
| | Passed | Pass | Pass |
| | Passed (5%) | Pass | Pass |
| 0.5 g | Passed (5%) | Pass | Pass |
| | Passed | Pass | Pass |
| | Failed | Pass | Pass |

EXAMPLE 5

The effects of lower concentrations of hydrogen peroxide and iron sulfate were evaluated. The results are shown below in Table 3.

TABLE 3

[t3]

| Amount of Ferrous sulfate added to 100 mL of Hydrogen Peroxide; Solutions were heated to boiling and held for 20 minutes. | Pass or Failure of the Crosshatch Tape Pull Test. An estimate of the percent of the area removed during the test is shown. Less than 5% removal is considered a positive test. Percent of Hydrogen Peroxide | |
|---|---|---|
| | 3% First Pull Test | 10% First Pull Test |
| 0.1 g | Pass | Pass |
| | Pass | Pass |
| | Pass | Pass |
| 0.3 g | Pass | Pass |
| | Pass | Pass |
| | Pass | Pass |

TABLE 3-continued

[t3]

| Amount of Ferrous sulfate added to 100 mL of Hydrogen Peroxide; Solutions were heated to boiling and held for 20 minutes. | Pass or Failure of the Crosshatch Tape Pull Test. An estimate of the percent of the area removed during the test is shown. Less than 5% removal is considered a positive test. Percent of Hydrogen Peroxide | |
|---|---|---|
| | 3% First Pull Test | 10% First Pull Test |
| 0.5 g | Pass | Pass |
| | Pass | Pass |
| | Pass | Pass |
| Blank (put in boiling hydrogen peroxide but with no FeSO$_4$) | Failed (>50%) | Failed (>50%) |
| | Failed (>50%) | Failed (>50%) |
| | Failed (>50%) | Failed (>50%) |

EXAMPLE 6

Six sets of three TPO strips identical to those of Example 1 were treated with a mixture of iron sulfate and cupric sulfate in 100 mL of 30% hydrogen peroxide as shown in Table 4. Low concentrations of ferrous sulfate (e.g. 0.001 g/100 ml and g/100 mL) were not effective in modifying the surface of the TPO coupons. A mixture of ferrous sulfate and cupric sulfate was effective in modifying the surface of the TPO coupons as shown below in Table 4 to allow the binding of a clear acrylic polymer. These data indicate that mixtures of transition metals in hydrogen peroxide can be effective in modifying the surface of the TPO coupons.

TABLE 4

[t4]

| Concentration of Ferrous Sulfate per 100 mL 30% Hydrogen Peroxide (g/100 mL) | Concentration of Cupric Sulfate per 100 mL 30% Hydrogen Peroxide (g/100 Ml) | Pass or Failure of the Crosshatch Adhesive Tape Test. |
|---|---|---|
| 0 | 0.5 | Fail |
| 0 | 0.5 | Fail |
| 0 | 0.5 | Fail |
| 0.001 | 0 | Fail |
| 0.001 | 0 | Fail |
| 0.001 | 0 | Fail |
| 0.01 | 0 | Fail |
| 0.01 | 0 | Fail |
| 0.01 | 0 | Fail |
| 0.05 | 0 | Pass |
| 0.05 | 0 | Pass |
| 0.05 | 0 | Pass |
| 0.001 | 0.5 | Pass |
| 0.001 | 0.5 | Pass |
| 0.001 | 0.5 | Pass |
| 0.01 | 0.5 | Pass |
| 0.01 | 0.5 | Pass |
| 0.01 | 0.5 | Pass |

As can be seen by the above test results, the present invention enables the application of high quality adherent coatings to the surface of a thermoplastic olefin material in an inexpensive and uncomplicated manner.

While the present invention has been described through the use of examples, it is appreciated that the present invention is not limited thereto and variations of the disclosure of the present invention can be made without departing from the true scope and spirit of the invention.

What is claimed is:

1. A method of activating a surface of a thermoplastic olefin comprising the steps of:

providing an aqueous immersion bath containing a water-soluble peroxide compound and at least one transition metal salt; and immersing the thermoplastic polyolefin in the aqueous immersion bath for a time sufficient to activate the surface of the thermoplastic polyolefin.

2. The method of claim 1, wherein said water-soluble peroxide compound is selected from the group consisting of hydrogen peroxide, sodium peroxyborate, sodium peroxycarbonate, ethyl hydroperoxide, peroxyacetic acid and mixtures thereof.

3. The method of claim 1, wherein said aqueous immersion bath is at a temperature of from 20 to 100° C.

4. The method of claim 1, wherein the pH of the aqueous immersion bath is no greater than 9.

5. The method of claim 1, wherein the anion of said transition metal salt is at least one member selected from the group consisting of chloride, sulfate, nitrate, carbonate, acetate and phosphate.

6. The method of claim 5, wherein said thermoplastic polyolefin is selected from the group consisting of polyethylene, polypropylene, polybutylene and copolymers, blends and alloys thereof.

7. The method of claim 1, wherein the water-soluble peroxide compound content is from 3 to 50 wt. % of the aqueous immersion bath.

8. The method of claim 1, wherein the content of the transition metal salt is from 0.05 to 0.5 g per 100 of the aqueous immersion bath.

9. The method of claim 1, wherein more than one transition metal salt is provided in the aqueous immersion bath.

10. The thermoplastic olefin having an activated surface produced by the method of claim 1.

11. A method of applying a coating onto a surface of a thermoplastic olefin comprising the steps of:

providing an aqueous immersion bath containing a water-soluble peroxide compound and at least one transition metal salt;

immersing the thermoplastic olefin in the aqueous immersion bath for a time sufficient to activate the surface of the thermoplastic olefin;

removing the thermoplastic olefin from the aqueous immersion bath;

rinsing and drying the thermoplastic olefin; and applying a coating onto the surface of the thermoplastic olefin.

12. The method of claim 11, wherein the coating is a clear coating.

13. The method of claim 11, wherein the coating is a color coating.

14. The method of claim 11, wherein the coating is a primer.

15. The method of claim 11, wherein the coating is an adhesive.

16. The method of claim 12, wherein said clear coating is selected from the group consisting of an acrylic coating, a polyurethane coating, a polyester coating and an epoxy coating.

17. The method of claim 11, wherein said at least one transition salt comprises an iron salt and a copper salt.

18. The method of claim 17, wherein said iron salt is ferrous sulfate and said copper salt is cupric sulfate.

19. The method of claim 11, wherein the water-soluble peroxide compound is hydrogen peroxide.

20. The thermoplastic polyolefin having a coated surface produced by the process of claim 11.

* * * * *